(12) United States Patent
Stephenson

(10) Patent No.: US 10,091,309 B2
(45) Date of Patent: Oct. 2, 2018

(54) SYSTEM AND METHOD FOR CREATE SESSION REDIRECTION

(71) Applicant: Verizon Patent and Licensing Inc., Arlington, VA (US)

(72) Inventor: Brian Joseph Stephenson, Saginaw, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 199 days.

(21) Appl. No.: 15/265,512

(22) Filed: Sep. 14, 2016

(65) Prior Publication Data
US 2018/0077246 A1   Mar. 15, 2018

(51) Int. Cl.
| | | |
|---|---|---|
| H04L 29/08 | (2006.01) | |
| H04W 76/02 | (2009.01) | |
| H04W 76/18 | (2018.01) | |
| H04W 76/20 | (2018.01) | |
| H04L 12/26 | (2006.01) | |
| H04L 29/12 | (2006.01) | |
| H04W 88/16 | (2009.01) | |

(52) U.S. Cl.
CPC ........ *H04L 67/148* (2013.01); *H04L 67/2814* (2013.01); *H04W 76/027* (2013.01); *H04W 76/18* (2018.02); *H04W 76/20* (2018.02); *H04L 43/16* (2013.01); *H04L 61/3075* (2013.01); *H04W 88/16* (2013.01)

(58) Field of Classification Search
CPC ... H04L 67/148; H04L 67/2814; H04L 67/02; H04L 67/08; H04L 67/1008; H04L 43/16; H04L 61/3075; H04L 12/2854; H04L 29/06; H04L 29/12066; H04L 63/08; H04W 76/18; H04W 76/20; H04W 36/0022
See application file for complete search history.

(56) References Cited

U.S. PATENT DOCUMENTS

| | | | | |
|---|---|---|---|---|
| 6,754,709 B1 * | 6/2004 | Gbadegesin | ............ | H04L 29/06 709/227 |
| 8,068,478 B2 * | 11/2011 | Cruz | ................... | H04L 12/2854 370/351 |
| 2002/0188678 A1 * | 12/2002 | Edecker | ............ | H04L 29/12066 709/204 |
| 2010/0131654 A1 * | 5/2010 | Malakapalli | ............ | H04L 67/08 709/227 |

(Continued)

OTHER PUBLICATIONS

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14)," 3GPP TS 29.274 V14.0.0, Jun. 2016, 361 pages.

*Primary Examiner* — Le H Luu

(57) ABSTRACT

A device may receive a create session (CS) request associated with establishing a packet data network (PDN) connection with a user device. The device may determine, based on receiving the CS request, that the CS request is to be redirected for establishment of the PDN connection. The device may identify, based on determining that the CS request is to be redirected, redirect information that identifies a particular PDN gateway to which the CS request is to be redirected. The device may provide a CS response, including the redirect information, to permit the PDN connection to be established between the user device and the particular PDN gateway.

20 Claims, 6 Drawing Sheets

(56) References Cited

U.S. PATENT DOCUMENTS

| | | | |
|---|---|---|---|
| 2010/0242092 A1* | 9/2010 | Harris | H04L 63/08 726/3 |
| 2012/0059934 A1* | 3/2012 | Rafiq | H04L 67/1008 709/225 |
| 2014/0280883 A1* | 9/2014 | Pieczul | H04L 67/02 709/224 |
| 2014/0359003 A1* | 12/2014 | Sullad | H04L 67/148 709/203 |
| 2017/0181042 A1* | 6/2017 | Dash | H04W 36/0022 |

* cited by examiner

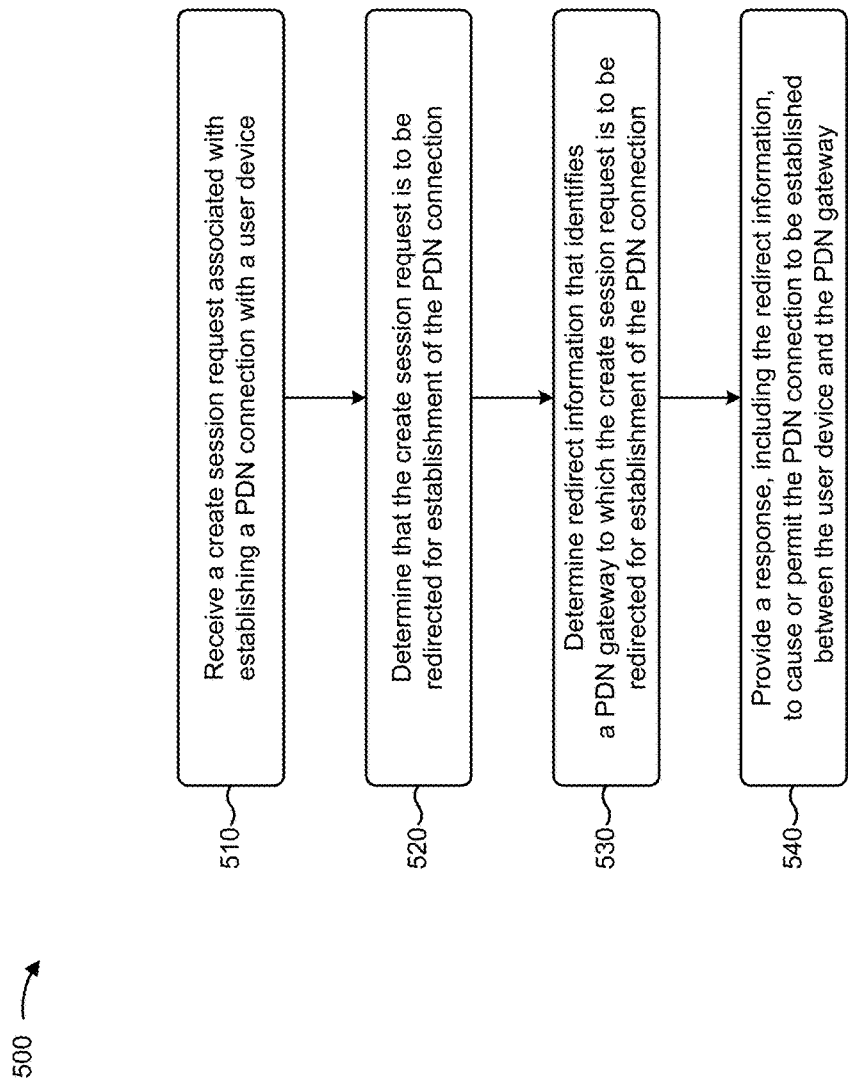

SYSTEM AND METHOD FOR CREATE SESSION REDIRECTION

BACKGROUND

A packet data network (PDN) gateway (PGW) may provide connectivity from a user device to external PDNs by being the point of exit and entry of network traffic for the user device. The PGW may perform policy enforcement, packet filtering, charging support, or the like, for the user device.

BRIEF DESCRIPTION OF THE DRAWINGS

FIG. 5 is a flow chart of an example process for redirecting a create session request associated with establishing a PDN connection.

DETAILED DESCRIPTION OF PREFERRED EMBODIMENTS

Figure 1A:
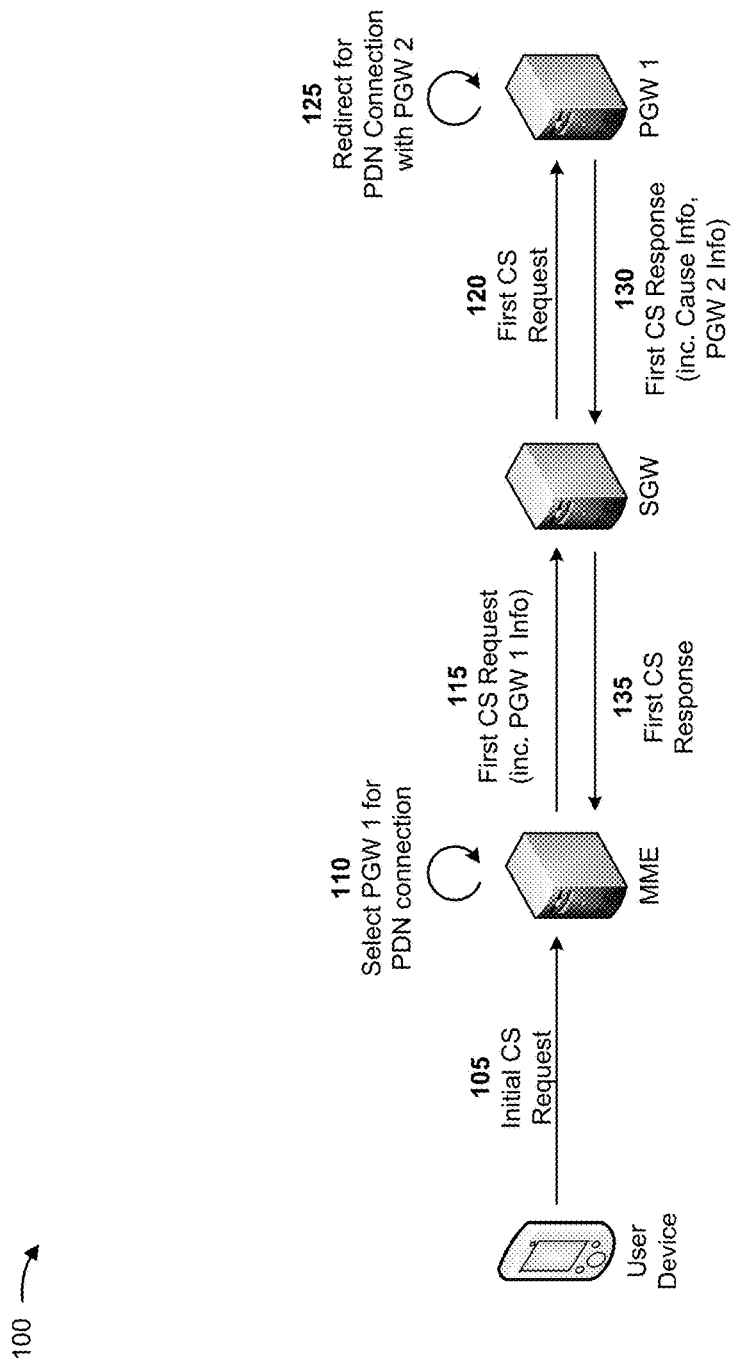
FIGS. 1A and 1B are diagrams of an overview of an example implementation described herein.

The following detailed description of example implementations refers to the accompanying drawings. The same reference numbers in different drawings may identify the same or similar elements.

A user device may attempt (e.g., at boot-up, when leaving airplane mode, when reestablishing a network connection) to establish a PDN connection in order to allow the user device to send and receive information via the PDN. In such a case, the user device may provide a request to establish a PDN connection (herein referred to as a create session or CS request) to a mobility management entity (MME) that selects a PGW with which the user device is to establish the PDN connection. The MME may send the CS request to the selected PGW (e.g., via a serving gateway (SGW)) in order to cause or permit the PDN connection to be established between the user device and the selected PGW.

However, a network operator, associated with the selected PGW, may wish for CS requests, received by the selected PGW, to be redirected to another PGW (e.g., such that the PDN connection may be established between the user device and the other PGW, rather than between the user device and the selected PGW). For example, a network operator may wish to redirect a specific volume of communication sessions to a newly integrated PGW to support certification. As another example, a network operator may wish to direct communication sessions away from a particular PGW in order to remove the particular PGW from service. As still another example, a network operator may wish to steer communication sessions to a PGW that has first office application (FOA) software in order to have a controlled environment in which to test the FOA software. As yet another example, a network operator may wish to steer connections to a particular under-loaded PGW (e.g., from an over-loaded PGW).

Implementations described herein may allow a first PGW to redirect a CS request to a second (particular) PGW in order to cause a PDN connection to be established between a user device and the second PGW (e.g., rather than between the user device and the first PGW). In this way, a speed at which a PGW is brought into service is increased and network operation is improved (as compared to use of a typical redirect technique that does not allow for redirection to a particular PGW) by allowing one PGW to redirect CS requests to another PGW. The present disclosure also improves performance ND efficiency by allowing one PGW to redirect CS requests to another PGW in order to support certification of the other PGW. Network operation also is improved (as compared to operation of the network using the typical redirect technique) by allowing a PGW to distribute CS requests to different PGWs, thereby reducing network congestion. Network operation also is improved by allowing a PGW to be taken out of service in a timely manner, and by allowing FOA software to be tested in a more controlled environment in order to facilitate faster testing and integration of FOA software.

Figure 1B:
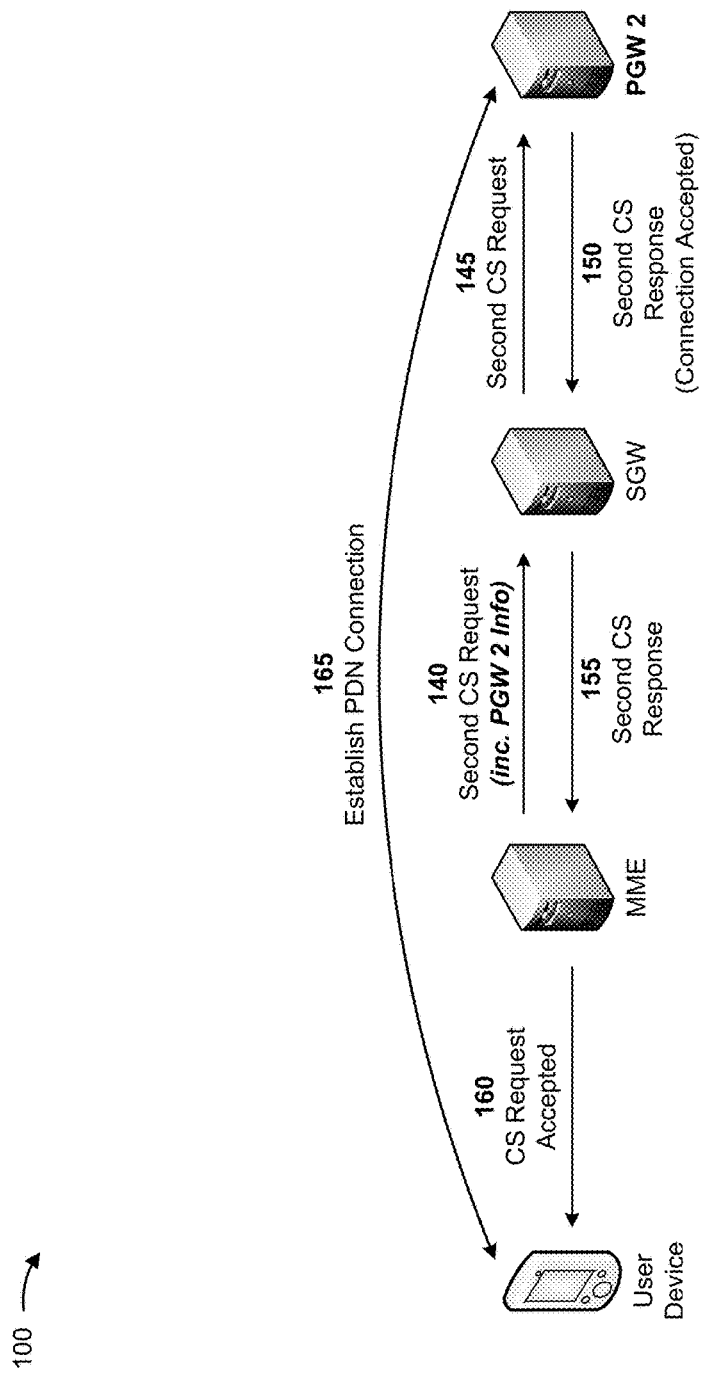

FIGS. 1A and 1B are diagrams of an overview of an example implementation 100 described herein. As shown in FIGS. 1A and 1B, example implementation 100 includes a user device, an MME, an SGW, a first PGW (PGW 1), and a second PGW (PGW 2).

As shown in FIG. 1A, and by reference number 105, the user device sends an initial CS request to the MME. The initial CS request may be a request for the user device to establish a connection to a PDN. As shown by reference number 110, the MME selects PGW 1 for the connection to the PDN. As shown by reference number 115, the MME sends a first CS request (including information associated with PGW 1) to the SGW. As shown by reference number 120, the SGW sends the first CS request to PGW 1.

As shown by reference number 125, PGW 1 determines that the CS request is to be redirected such that the PDN connection is established with PGW 2 (rather than PGW 1). For example, PGW 1 may determine that the first CS request is to be redirected based on a time at which the first CS request is received (e.g., a particular window of time, a particular date), based on information associated with the user device (e.g., when PGW 1 is configured to redirect CS requests provided by a set of user devices that includes the user device), based on a number of communication sessions associated with PGW 1 (e.g., when PGW 1 is configured with a session threshold that identifies a maximum number of PDN connections that PGW 1 may support at a given time), or the like.

In some implementations, PGW 1 may determine redirect information associated with redirecting the first CS request. The redirect information may include information associated with redirecting the first CS request to another PGW (in this case PGW 2), such as a fully qualified domain name (FQDN) associated with PGW 2, address information associated with PGW 2, or the like.

As shown by reference number 130, PGW 1 sends, to the SGW, a first CS response based on determining the redirect information. The first CS response may include the redirect information, cause information (e.g., a cause code indicating that PGW 1 is rejecting the CS request and a reason for rejecting the CS request), or the like. As shown by reference number 135, SGW sends the first CS response to the MME.

As shown in FIG. 1B, and by reference number 140, the MME may, based on receiving the request and identifying the cause code as being associated with a redirect, send a second CS request (including the information associated with PGW 2) to the SGW. As shown by reference number 145, the SGW sends the second CS request to PGW 2. As shown by reference number 150, assume that PGW 2 accepts the CS request (i.e., that PGW 2 is available to establish the PDN connection with the user device). PGW 2 sends a second CS response (indicating that the CS request is accepted) to the SGW. As shown by reference number 155, the SGW sends the second CS response to the MME. As shown by reference number 160, the MME sends, to the user device, an indication that the CS request has been accepted. As shown by reference number 165, the user device may then establish a PDN connection with PGW 2.

In this way, a first PGW may redirect a CS request to a second PGW in order to cause a PDN connection to be established between a user device and the second PGW (e.g., rather than between the user device and the first PGW), thereby improving operation of the network, integration of the second PGW into service, removal of the first PGW 1 from service, or the like, as described above.

As indicated above, FIGS. 1A and 1B are provided merely as an example. Other examples are possible and may differ from what was described with regard to FIGS. 1A and 1B.

Figure 2:
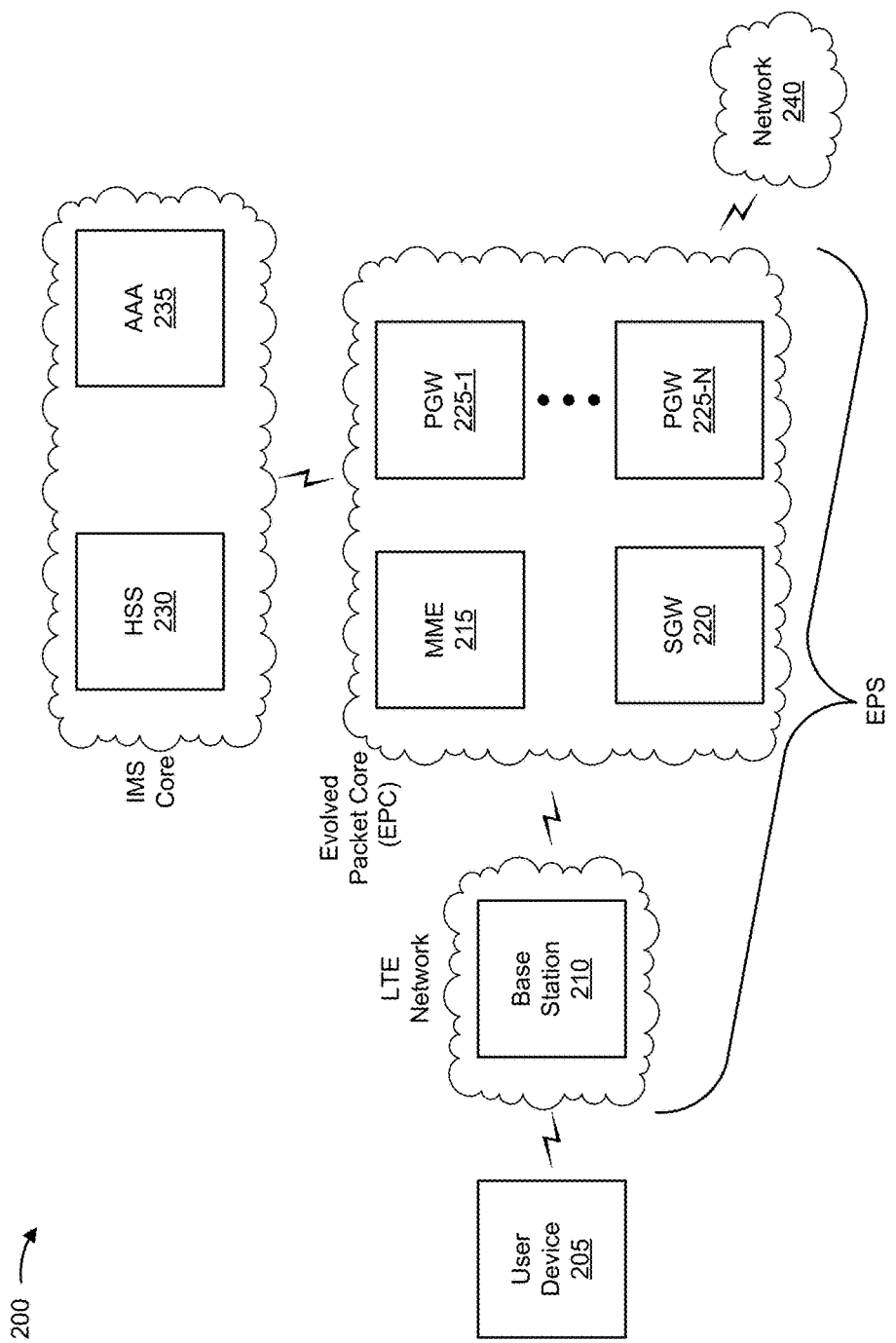
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205; a base station 210; a MME 215; a SGW 220; PGWs 225-1 through 225-N(N>1); a home subscriber server (HSS) 230; an authentication, authorization, and accounting server (AAA) 235; and a network 240. Devices of environment 200 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network or a next generation network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user device 205 communicates with the EPC. The EPC may include MME 215, SGW 220, and/or PGW 225 that enable user device 205 to communicate with network 240 and/or an Internet protocol (IP) multimedia subsystem (IMS) core. The IMS core may include HSS 230 and/or AAA 235, and may manage device registration and authentication, session initiation, etc., associated with user devices 205. HSS 230 and/or AAA 235 may reside in the EPC and/or the IMS core.

User device 205 includes one or more devices capable of communicating with base station 210 and/or a network (e.g., network 240). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 205 may send traffic to and/or receive traffic from network 240 (e.g., via base station 210, SGW 220, and/or PGW 225).

Base station 210 includes one or more devices capable of transferring traffic, such as audio, video, text, and/or other traffic, destined for and/or received from user device 205. In some implementations, base station 210 may include an eNB associated with the LTE network that receives traffic from and/or sends traffic to network 240 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 includes one or more devices, such as one or more network devices and/or server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 includes one or more devices capable of routing packets. For example, SGW 220 may include one or more network devices and/or one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 240 (e.g., via PGW 225) and/or other network devices associated with the EPC and/or the IMS core. SGW 220 may also receive traffic from network 240 and/or other network devices, and may send the received traffic to user device 205 via base station 210. Additionally, or alternatively, SGW 220 may perform operations associated with handing off user device 205 to and/or from an LTE network.

PGW 225 includes one or more devices capable of providing connectivity for user device 205 to external packet data networks (e.g., other than the depicted EPC and/or LTE network). Further, PGW 225 includes a device capable of redirecting a CS request associated with establishing a PDN connection. For example, PGW 225 may include one or more network devices and/or one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to user device 205 via SGW 220 and base station 210. PGW 225 may record data usage information (e.g., byte usage), and may provide the data usage information to AAA 235.

HSS 230 includes one or more devices, such as one or more server devices, capable of managing (e.g., receiving, generating, storing, processing, and/or providing) information associated with user device 205. For example, HSS 230 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 includes one or more devices, such as one or more server devices, that perform authentication, authorization, and/or accounting operations for communication sessions associated with user device 205. For example, AAA 235 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

Network 240 includes one or more wired and/or wireless networks. For example, network 240 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
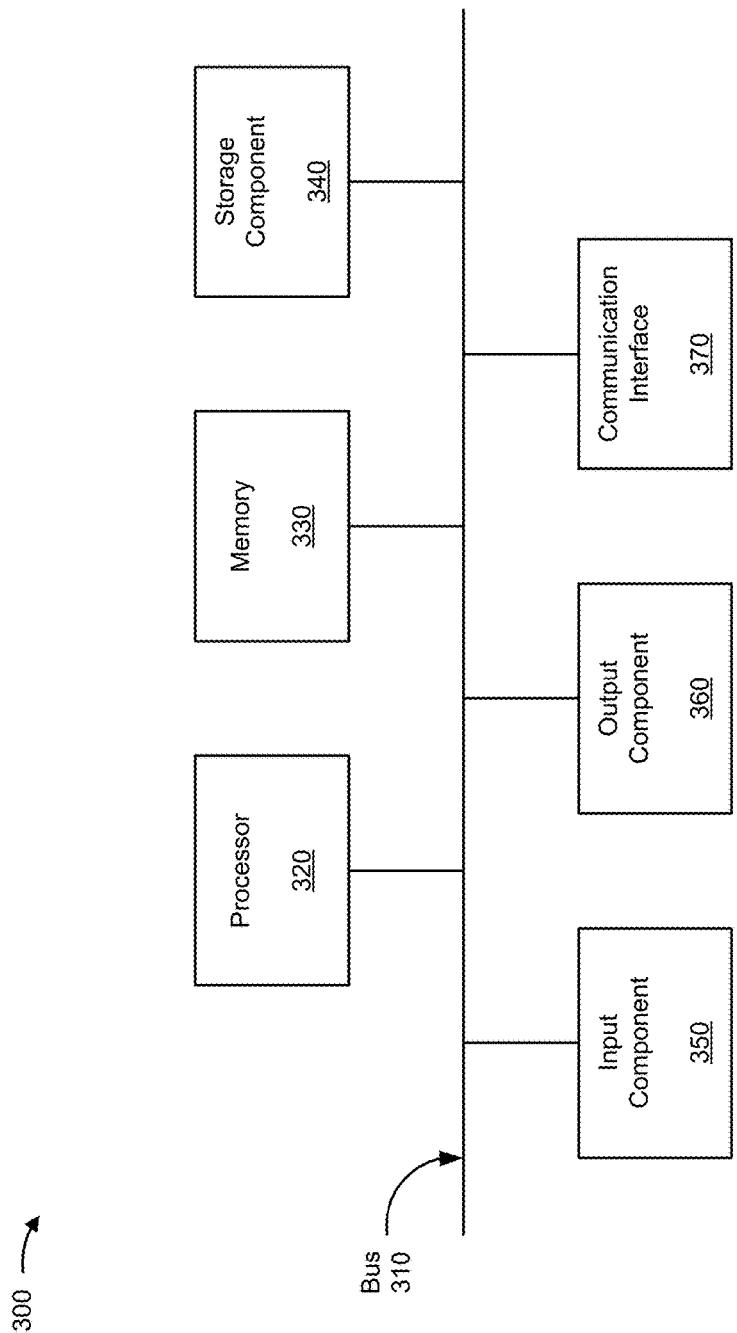
FIG. 3 is a diagram of example components of one or more devices of FIG. 2.

FIG. 3 is a diagram of example components of a device 300. Device 300 may correspond to user device 205; base station 210; MME 215; SGW 220; PGW 225; HSS 230; and/or AAA 235. In some implementations, user device 205; base station 210; MME 215; SGW 220; PGW 225; HSS 230; and/or AAA 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
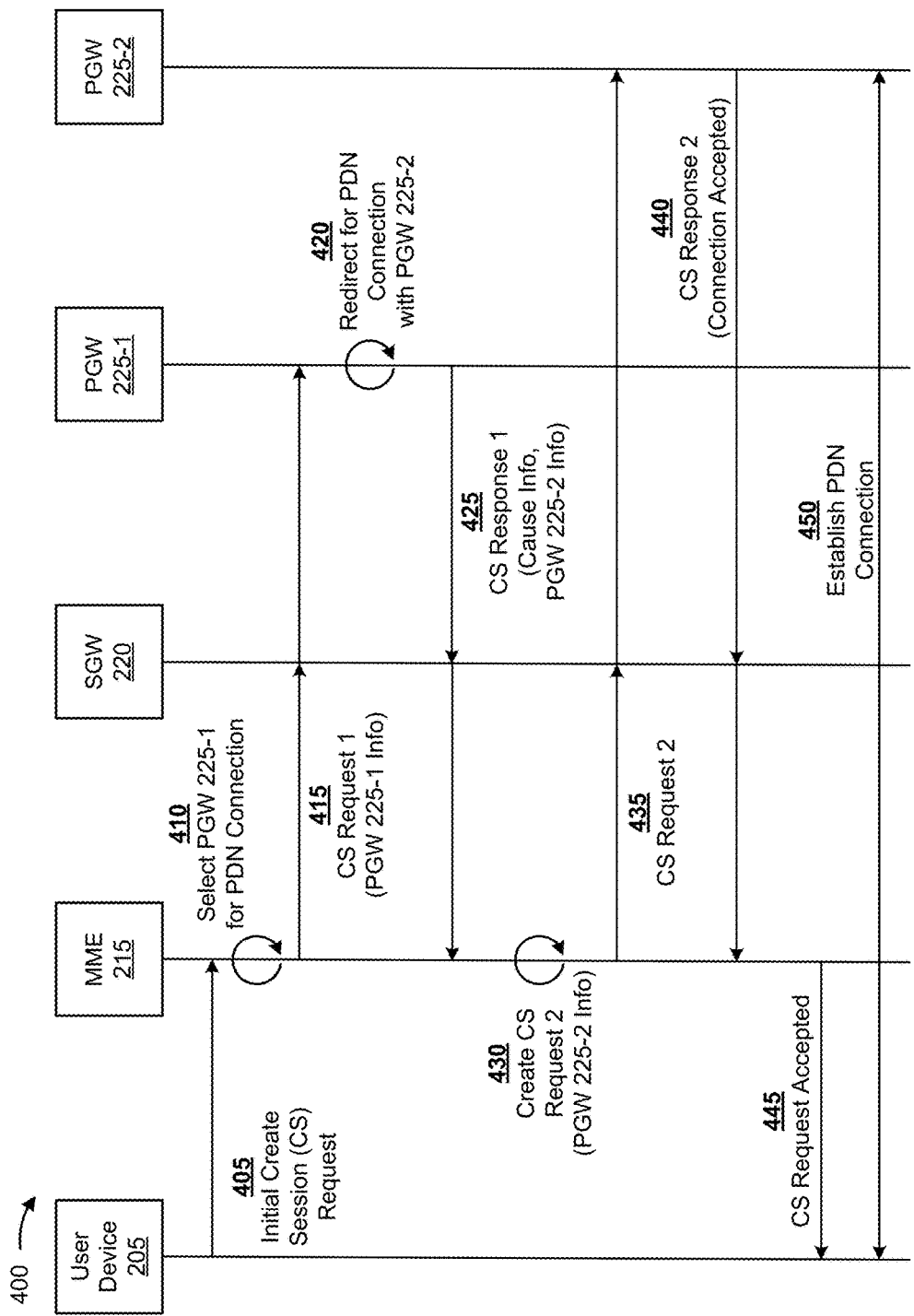
FIG. 4 is a call flow diagram of an example process for redirecting a create session request associated with establishing a PDN connection.

FIG. 4 is a call flow diagram of an example process 400 for redirecting a CS request associated with establishing a PDN connection between a user device and a PGW. As shown in FIG. 4, example process 400 includes user device 205, MME 215, SGW 220, PGW 225-1, and PGW 225-2.

As shown in FIG. 4, process 400 may include providing an initial create session request associated with establishing a PDN connection (shown at reference number 405). For example, user device 205 may provide, to MME 215, an initial CS request associated with establishing a PDN connection.

In some implementations, the initial CS request may be associated with establishing a PDN connection between user device 205 and a PGW 225 such that user device 205 may send and/or receive information via the PDN. In some implementations, the initial CS request may include information associated with user device 205, such as a device identifier (e.g., an international mobile subscriber identity (IMSI), a mobile directory number (MDN), or the like), an access point name (APN) associated with user device 205, or the like.

In some implementations, user device 205 may (automatically) send the initial CS request when user device 205 powers on, boots up, exits airplane mode, seeks to reestablish (or establish) a connection to a network, or the like. Additionally, or alternatively, user device 205 may send the initial CS request based on a user input (e.g., when a user provides an input indicating that user device 205 is to establish a PDN connection). In some implementations, user device 205 may provide the initial CS request via base station 210 to MME 215.

As further shown in FIG. 4, process 400 may include selecting PGW 225 with which the PDN connection may be established (shown at reference number 410). For example, MME 215 may select a PGW 225 (e.g., PGW 225-1) with which the PDN connection may be established.

In some implementations, MME 215 may receive the initial CS request (e.g., via base station 210) and select a first PGW (e.g., PGW 225-1) for establishing the PDN connection with user device 205. In some implementations, MME 215 may select PGW 225-1 based on the information associated with user device 205. For example, MME 215 may select PGW 225-1 based on the APN associated with user device 205, based on the device identifier, or based on another type of selection procedure.

As further shown in FIG. 4, process 400 may include providing a first create session request, associated with establishing the PDN connection, to a first PGW (shown at reference number 415). For example, MME 215 may provide a first CS request (CS request 1), associated with establishing the PDN connection to PGW 225-1.

As shown, the first CS request may include information associated with PGW 225-1 (e.g., information that identifies PGW 225-1) such that the first CS request is direct to PGW 225-1. In some implementations, the first CS request may also include information associated with user device 205 (e.g., the user device identifier, the APN, or the like). As shown, in some implementations, MME 215 may provide the first CS request to SGW 220, and SGW 220 may forward the first CS request to PGW 225-1.

As further shown in FIG. 4, process 400 may include determining that the create session request is to be redirected to a second PGW for establishment of the PDN connection (shown at reference number 420). For example, PGW 225-1 may determine that the first CS request is to be redirected to a second (particular) PGW 225 (e.g., PGW 225-2) for establishment of the PDN connection.

In some implementations, PGW 225-1 may determine that the first CS request is to be redirected to PGW 225-2 based on a time at which PGW 225-1 receives the first CS request. For example, PGW 225-1 may be configured to redirect a CS request received at any time, during a particular time window (e.g., a range of time during a day, a set of days during a week, during a particular month), during a particular length of time (e.g., a next two hours, a next seven days), or the like.

Additionally, or alternatively, PGW 225-1 may determine that the first CS request is to be redirected based on information associated with user device 205. For example, PGW 225-1 may be configured to redirect CS requests provided by a set of user devices 205 that includes user device 205. In such a case, PGW 225-1 may determine that the first CS request is to be redirected based on the device identifier associated with user device 205. As another example, PGW 225-1 may be configured to redirect CS requests associated with the APN corresponding to user device 205.

Additionally, or alternatively, PGW 225-1 may determine that the first CS request is to be redirected based on a number of communication sessions associated with PGW 225-1. For example, PGW 225-1 may be configured with a session threshold that identifies a maximum number of PDN connections that PGW 225-1 may support at a given time. In such a case, PGW 225-1 may, based upon receiving the first CS request, determine whether a number of PDN connections being supported by PGW 225-1 satisfies the session threshold, and determine whether the first CS request is to be redirected accordingly.

In some implementations, after PGW 225-1 determines that the first CS request is to be redirected, PGW 225-1 may determine redirect information that identifies a particular PGW (e.g., PGW 225-2) to which the first CS request is to be redirected for establishment of the PDN connection. The redirect information may include information associated with redirecting the first CS request to another PGW 225. For example, the redirect information may include information that identifies PGW 225-2, such as a fully qualified domain name (FQDN) associated with PGW 225-2, address information associated with PGW 225-2 (e.g., an IP address for an interface of PGW 225-2), or the like.

In some implementations, PGW 225-1 may store (or have access to) respective redirect information for different user devices 205 and/or different APNs. In such a case, PGW 225-1 may access the stored redirect information and may determine the redirect information for PGW 225-2 based on the device identifier and/or APN associated with user device 205. In other words, in some implementations, PGW 225-1 may determine first redirect information for a CS request associated with a first user device 205, and second (i.e., different) redirect information for a CS request associated with a second user device 205.

In some implementations, the redirect information may identify multiple PGWs 225 (e.g., a primary PGW 225 to which the first CS request is to be forwarded, a secondary PGW 225 to which the first CS request is to be forwarded if the primary PGW 225 is unavailable, etc.). In some implementations, PGW 225-1 may receive (e.g., based on a user input, based on an automatic configuration of the EPC) and store the redirect information, and may determine the redirect information from storage.

As further shown in FIG. 4, process 400 may include providing a first create session response, including redirect information associated with redirecting the create session request, to cause or permit the PDN connection to be established with the second PGW (shown at reference number 425). For example, PGW 225-1 may provide a first CS response 1, including the redirect information, to cause or permit the PDN connection to be established with PGW 225-2.

In some implementations, the first CS response may include the redirect information that identifies PGW 225-2 to which the CS request is to be redirect. Additionally, or alternatively, the first CS response may include cause information (e.g., a cause code) indicating that PGW 225-1 cannot accept the first CS request and/or indicating that the first CS request is to be redirected. In some implementations, the first CS response may include the redirect information and/or the cause information in a private extension that may be interpreted by MME 215, as described below.

In some implementations, PGW 225-1 may cause the connection to be established between user device 205 and PGW 225-2 since the PDN connection is established between user device 205 and PGW 225-2 as a result of PGW 225-1 providing the first CS response, as described below. Additionally, or alternatively, PGW 225-1 may permit the connection to be established between user device 205 and PGW 225-2 since the PDN connection may be established between user device 205 and PGW 225-2 after PGW 225-1 provides the first CS response (i.e., since the PDN connection may not otherwise have been established between user device 205 and PGW 225-2).

In this way, PGW 225-1 may provide the first CS response in order to cause or permit the PDN connection to be established between user device 205 and a particular PGW 225 (e.g., PGW 225-2). In some implementations, PGW 225-1 may provide the first CS response to SGW 220, and SGW 220 may forward the first CS response to MME 215.

As further shown in FIG. 4, process 400 may include creating a second create session request, associated with the second PGW, based on the first create session response (shown at reference number 430). For example, MME 215 may create a second CS request (CS request 2) based on the first CS response.

In some implementations, MME 215 may receive the first CS response and determine, based on the cause information and/or the redirect information, that MME 215 is to provide the second CS request to PGW 225-2. Here, MME 215 may create the second CS request based on such a determination.

In some implementations, MME 215 may create the second CS request as a new CS request that is to be provided to PGW 225-2. In such a case, the new CS request may include the information associated with PGW 225-2 (e.g., the FQDN, the interface IP address) such that the second CS request may be provided to PGW 225-2.

In some implementations, MME 215 may modify the first CS request (e.g., when MME 215 stores the first CS request or receives the first CS request in the first CS response) in order to create the second CS request. In such a case, MME 215 may modify the first CS request to include the information associated with PGW 225-2.

As further shown in FIG. 4, process 400 may include providing the second create session request, associated with establishing the PDN connection, to the second PGW (shown at reference number 435). For example, MME 215 may provide the second CS request to PGW 225-2. In some implementations, MME 215 may provide the second CS request to SGW 220, and SGW 220 may forward the second CS request to PGW 225-2 (e.g., based on the FQDN and/or interface IP included in the second CS request).

As further shown in FIG. 4, process 400 may include providing a second create session response in order to allow the PDN connection to be established (shown at reference number 440). For example, PGW 225-2 may provide a second CS response (CS response 2) in order to allow the PDN connection to be established.

For the purpose of example process 400, assume that PGW 225-2 receives the second CS request, and that PGW 225-2 determines not to redirect the second CS request to another PGW 225. In such a case, PGW 225-2 may determine (e.g., in a typical manner) that PGW 225-2 is capable of supporting the PDN connection with user device 205 and, as shown, may provide the second CS response indicating that the PDN connection with user device 205 may be established (i.e., that PGW 225-2 has accepted the PDN connection). In some implementations, PGW 225-2 may provide the second CS response to SGW 220, and SGW 220 may forward the second CS response to MME 215.

As further shown in FIG. 4, process 400 may include providing a notification that the create session request has been accepted (shown at reference number 445) and establishing the PDN connection with the second PGW (shown at reference number 450).

In some implementations, MME 215 may receive the second CS response and notify user device 205 that the initial CS request (provided by user device 205) has been accepted. In such a case, the notification may include information that allows user device 205 to establish the PDN connection with PGW 225-2. In some implementations, user device 205 may, based on receiving the notification, initiate a PDN connection with PGW 225-2 and the connection may be established.

In this way, PGW 225-1 may redirect the CS request to PGW 225-2 in order to cause or permit a PDN connection to be established between user device 205 and PGW 225-2 (e.g., rather than between user device 205 and PGW 225-1), thereby improving operation of the network, integration of the second PGW into service, removal of the first PGW 1 from service, or the like, as described above.

Although FIG. 4 shows example operations of process 400, in some implementations, process 400 may include additional operations, fewer operations, different operations, or differently arranged operations than those depicted in FIG. 4. Additionally, or alternatively, two or more of the operations of process 400 may be performed in parallel.

FIG. 5 is a flow chart of an example process 500 for redirecting a CS request associated with establishing a PDN connection. In some implementations, one or more process blocks of FIG. 5 may be performed by PGW 225-1. In some implementations, one or more process blocks of FIG. 5 may be performed by another device separate from or in combination with PGW 225-1, such as MME 215 or SGW 220.

As shown in FIG. 5, process 500 may include receiving a CS request associated with establishing a PDN connection with a user device (block 510). For example, PGW 225-1 may receive a CS request associated with establishing a PDN connection with user device 205, as described above in connection with FIG. 4.

As further shown in FIG. 5, process 500 may include determining that the CS request is to be redirected for establishment of the PDN connection (block 520). For example, PGW 225-1 may determine that the CS request is to be redirected to another PGW 225 for establishment of the PDN connection with user device 205, as described above in connection with FIG. 4.

As shown in FIG. 5, process 500 may include determining redirect information that identifies a PGW to which the CS request is to be redirected for establishment of the PDN connection (block 530). For example, PGW 225-1 may determine redirect information that identifies a PGW 225-2 to which the CS request is to be redirected for establishment of the PDN connection, as described above in connection with FIG. 4.

As further shown in FIG. 5, process 500 may include providing a response, including the redirect information, to cause or permit the PDN connection to be established between the user device and the PGW (block 540). For example, PGW 225-1 may provide a response, including the redirect information, to cause or permit the PDN connection to be established between user device 205 and the PGW 225-2, as described above in connection with FIG. 4.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may allow a first PGW to redirect a CS request to a second (particular) PGW in order to permit a PDN connection to be established between a user device and the second PGW (e.g., rather than between the user device and the first PGW when the first PGW cannot handle the CS request). In this way, a speed at which a PGW is brought into service is increased and network operation is improved (as compared to use of a typical redirect technique that does not allow for redirection to a particular PGW) by allowing one PGW to redirect CS requests to another PGW in order to support certification of the other PGW. Network operation also is improved (as compared to operation of the network using the typical redirect technique) by allowing a PGW to distribute CS requests to different PGWs, thereby reducing network congestion. Network operation also is improved by allowing a PGW to be taken out of service in a timely manner, and by allowing FOA software to be tested in a more controlled environment in order to facilitate faster testing and integration of FOA software.

The foregoing disclosure provides illustration and description, but is not intended to be exhaustive or to limit the implementations to the precise form disclosed. Modifications and variations are possible in light of the above disclosure or may be acquired from practice of the implementations. For example, while implementations described herein are described in the context of user device 205 communicating via an LTE network with MME 215 and/or SGW 220 in order to communicate with PGWs 225, other implementations are possible. For example, user device 205 may communicate via a WLAN (e.g., a WiFi network) with an evolved packet data gateway (ePDG) in order to communicate with PGWs 225. In such a case, a CS request may be redirected in a similar manner to that described above. Additionally, in such a case, the CS request may be redirected by PGW 225 based on information that identifies the WLAN, information that identifies the ePDG, or the like.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a create session (CS) request associated with establishing a packet data network (PDN) connection with a user device;
determine, based on receiving the CS request, that the CS request is to be redirected for establishment of the PDN connection;
identify, based on determining that the CS request is to be redirected, redirect information that identifies a particular PDN gateway to which the CS request is to be redirected; and
provide a CS response, including the redirect information, to permit the PDN connection to be established between the user device and the particular PDN gateway.

2. The device of claim 1, where the one or more processors are further to:
  identify a time at which the device receives the CS request; and
  where the one or more processors, when determining that the CS request is to be redirected for establishment of the PDN connection, are to:
    determine that the CS request is to be redirected based on the time at which the device receives the CS request.

3. The device of claim 1, where the one or more processors are further to:
  identify, based on the CS request, a user device identifier, associated with the user device, or an access point name (APN) associated with the user device; and
  where the one or more processors, when determining that the CS request is to be redirected for establishment of the PDN connection, are to:
    determine that the CS request is to be redirected based on the user device identifier or the APN.

4. The device of claim 1, where the one or more processors are further to:
  determine that the device supports a number of PDN connections that satisfies a threshold,
    the threshold identifying a maximum number of PDN connections to be concurrently supported by the device; and
  where the one or more processors, when determining that the CS request is to be redirected for establishment of the PDN connection, are to:
    determine that the CS request is to be redirected based determining that the device supports the number of PDN connections that satisfies the threshold.

5. The device of claim 1, where the CS response further includes information indicating that the device cannot accept the CS request or indicating that the CS request is to be redirected.

6. The device of claim 1, where the one or more processors are further to:
  identify, based on the CS request, a user device identifier, associated with the user device, or an access point name (APN) associated with the user device; and
  where the one or more processors, when identifying the redirect information, are to:
    identify the redirect information based on the user device identifier or the APN.

7. The device of claim 1, where the particular PDN gateway is a primary PDN gateway, and the redirect information further includes information associated with a secondary PDN gateway,
  the secondary PDN gateway being a PDN gateway to which the CS request is to be redirected if the primary PDN gateway rejects the CS request.

8. A non-transitory computer-readable medium storing instructions, the instructions comprising:
  one or more instructions that, when executed by one or more processors, cause the one or more processors to:
    receive a request associated with establishing a packet data network (PDN) connection with a user device;
    determine, based on receiving the request, that the request is to be redirected;
    identify, based on determining that the request is to be redirected, redirect information that identifies a particular PDN gateway to which the request is to be redirected; and
    provide a response to cause the PDN connection to be established between the user device and the particular PDN gateway,
      the response including the redirect information.

9. The non-transitory computer-readable medium of claim 8, where the one or more instructions, when executed by the one or more processors, further cause the one or more processors to:
  identify a time at which the request is received; and
  where the one or more instructions, that cause the one or more processors to determine that the request is to be redirected, cause the one or more processors to:
    determine that the request is to be redirected based on the time at which the request was received.

10. The non-transitory computer-readable medium of claim 8, where the one or more instructions, when executed by the one or more processors, further cause the one or more processors to:
  identify, based on the request, an access point name (APN) associated with the user device; and
  where the one or more instructions, that cause the one or more processors to determine that the request is to be redirected, cause the one or more processors to:
    determine that the request is to be redirected based on the APN.

11. The non-transitory computer-readable medium of claim 8, where the one or more instructions, when executed by the one or more processors, further cause the one or more processors to:
  determine that a device, to which the request was sent for establishment of the PDN connection, supports a number of PDN connections that satisfies a threshold,
    the threshold identifying a maximum number of PDN connections to be concurrently supported by the device; and
  where the one or more instructions, that cause the one or more processors to determine that the request is to be redirected, cause the one or more processors to:
    determine that the request is to be redirected based on determining that the device supports the number of PDN connections that satisfies the threshold.

12. The non-transitory computer-readable medium of claim 8, where the response further includes information indicating that the request is to be redirected.

13. The non-transitory computer-readable medium of claim 8, where the one or more instructions, when executed by the one or more processors, further cause the one or more processors to:
  identify, based on the request, a user device identifier associated with the user device; and
  where the one or more instructions, that cause the one or more processors to identify the redirect information, cause the one or more processors to:
    identify the redirect information based on the user device identifier.

14. The non-transitory computer-readable medium of claim 8, where the particular PDN gateway is a primary PDN gateway, and the redirect information further includes information associated with a secondary PDN gateway,
  the secondary PDN gateway being a PDN gateway to which the request is to be redirected if the primary PDN gateway rejects the request.

15. A method, comprising:
  receiving, by a network device, a request associated with establishing a packet data network (PDN) connection with a user device;

determining, by the network device and based on receiving the request, that the request is to be redirected for establishment of the PDN connection;

identifying, by the network device and based on determining that the request is to be redirected, redirect information that identifies another network device to which the request is to be redirected; and providing, by the network device, a response to permit the PDN connection to be established between the user device and the other network device, the response including the redirect information.

16. The method of claim 15, further comprising:

identifying a time at which the network device receives the request; and where determining that the request is to be redirected for establishment of the PDN connection comprises:

determining that the request is to be redirected based on the time at which the network device receives the request.

17. The method of claim 15, further comprising:

identifying, based on the request, information associated with the user device; and where determining that the request is to be redirected for establishment of the PDN connection comprises:

determining that the request is to be redirected based on the information associated with the user device.

18. The method of claim 15, further comprising:

determining that the network device supports a number of PDN connections that satisfies a threshold; and where determining that the request is to be redirected for establishment of the PDN connection comprises:

determining that the request is to be redirected based determining that the network device supports the number of PDN connections that satisfies the threshold.

19. The method of claim 15, further comprising:

identifying, based on the request, information associated with the user device; and where identifying the redirect information further comprises:

identifying the redirect information based on the information associated with the user device.

20. The method of claim 15, where the other network device is a primary network device, and the redirect information further includes information associated with a secondary network device, the secondary network device being a network device to which the request is to be redirected if the primary network device rejects the request.

* * * * *